May 28, 1968  HANS-GEORG LINDENBERG  3,385,467
PLUG FOR GALVANIC ELEMENTS, AND PARTICULARLY
FOR STORAGE BATTERIES
Filed Sept. 14, 1965
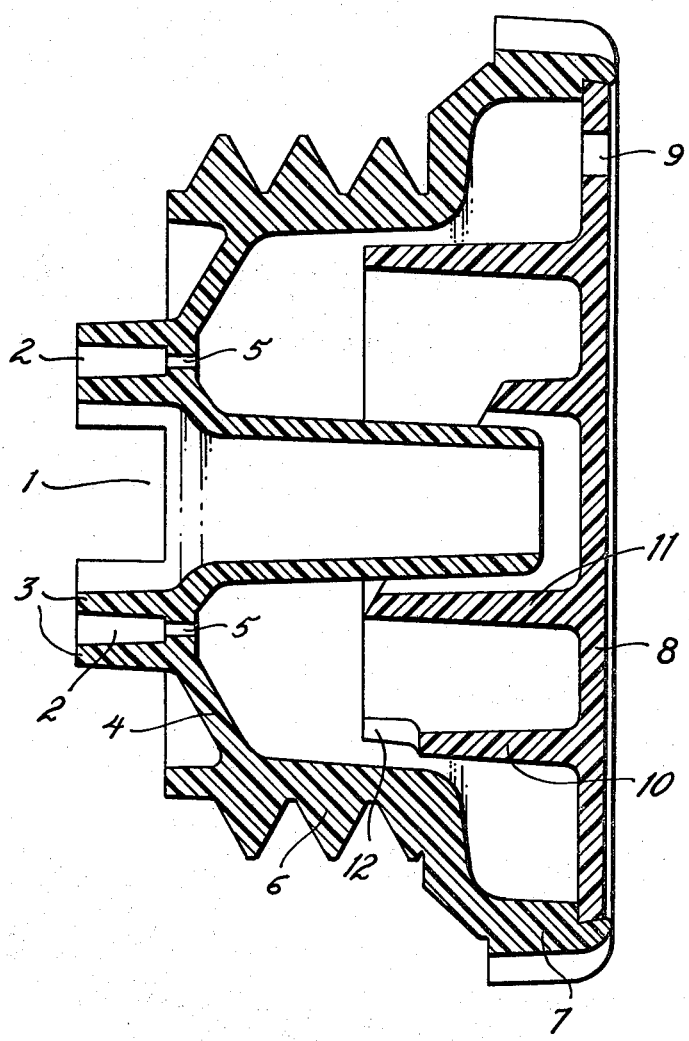
INVENTOR.
HANS-GEORG LINDENBERG
BY Alfred Stapler
ATTORNEY.

United States Patent Office 3,385,467
Patented May 28, 1968

3,385,467
PLUG FOR GALVANIC ELEMENTS, AND PARTICULARLY FOR STORAGE BATTERIES
Hans-Georg Lindenberg, Hannover-Stoecken, Germany, assignors to Varta Aktiengesellschaft, Hagen, Westphalia, Germany, a corporation of Germany
Filed Sept. 14, 1965, Ser. No. 487,112
Claims priority, application Germany, Sept. 19, 1964, V 16,731
14 Claims. (Cl. 220—44)

ABSTRACT OF THE DISCLOSURE

The invention provides a plug or cap for a container, for example, a galvanic cell or storage battery, which contains a liquid, for example, an electrolyte, from which a gas or a vapor is evolved. The plug is internally constructed so that gas which bears entrained liquid escapes first into a broad frusto-conical gas inlet opening and then is channeled through a plurality of narrow conical annular passages of varying heights and, in some embodiments, passages of additionally varying widths, before escaping from the battery through a vent opening in a top surface plate of the plug, while being scrubbed through films of the liquid in the narrow passages. The liquid so separated drains under capillary action back into the container through a pair of superposed narrow drain passages adjacent to the bottom of the frusto-conical gas inlet. The passages provide regions of variable impedance to the gas flow and the liquid films in the passages provide hightly efficient gas scrubbing action. Evaporation of liquid from the container is simultaneously greatly reduced.

---

This invention relates to plugs or caps for closing batteries. The principal function of such plugs is to close individual battery cells in a manner which prevents the escape of liquid, but not of gas. The interiors of such plugs, between the openings in their tops and bottoms, are so designed that gases evolved within the battery can pass through unobstructed, whereas drops of electrolyte present due to agitation or charging of the battery are intercepted and drained back into the interior of the cell.

Known attempts to accomplish the above purposes involve providing the plugs with deflector plates, helical passages and other internal detours. It is also known to provide, in front of the gas escape openings, or vents of the plug, shields which are either fitted to the lid of the plug or are attached as separate, extraneous elements to the bottom of the plug or to the cell separator. The liquid return flow is ducted through circular or rectangular gas escape vents in the bottom of the plug.

It is also known to provide in the bottom of the plug separate openings, or vents for the liquid-laden gas and the liquid return flow.

In either case there arises the hitherto unsolved problem of correctly proportioning the sizes of the drainage openings. If these are made big enough to permit the liquid to drain without difficulty, then they also function as gas escape openings. If they are made so small that gas cannot escape, then capillary forces arise which seriously interfere with liquid drainage.

Accordingly, it is a primary object of this invention to provide a battery plug which is free from the above-described shortcomings and problems of the prior art.

This and other objects which will appear are achieved in accordance with the invention by providing a plug whose interior is so constructed that the gas which bears liquid droplets is channeled, before escaping through an air opening in the plug cover, through annular passages of varying heights. These passages provide regions of minimum impedance to gas flow which are so located that the gas must traverse as long a path as possible, thereby losing a large part of its kinetic energy. In addition, these annular passages contain liquid films which provide additional impedance to gas flow and simultaneously reduce greatly the evaporation of liquid from the container. These films trap the droplets of liquid so that, by virtue of the special construction of the passages, drops are formed at certain locations. These drops are returned to the liquid in the container by means of annular passages, also containing liquid films, in the bottom of the plug.

It is a feature of the invention that a plug can be made with an over-all height which is much less than that of all previously known arrangements while still preventing any escape of liquid through the opening in its top surface. In addition, the distance between the surface of the liquid and the plug, which is sometimes referred to as the splash protection distance, can be greatly reduced. It has been determined experimentally that for storage batteries that distance need be only in a range of about 14 to 16 mm., rather than 22 to 25 mm., as heretofore. It therefore becomes possible to either reduce the over-all height of the storage battery or increase the intervals between servicings by filling it with a greater quantity of electrolyte.

For further details reference may be had to the discussion which follows and the accompanying single figure of drawing which shows, in cross-section, an embodiment of this invention.

Referring now to the drawing, the plug there shown consists of two parts distinguished by differently oriented cross-hatching. The lower portion which, except for its external threading, is rotationally symmetrical, is provided with a frusto-conical gas inlet opening 1. This opening does not fill up with droplets of liquid. The sloping portion 4 of the bottom wall is provided with two annularly curved passages 5. These are preferably conical, tapering toward the interior of the plug, and are arranged in mirror-image relationship to each other. The side wall 6, which is provided with an external thread, terminates in a flat cylindrical extension 7.

The upper portion 8 of the plug, which is provided with a gas escape opening 9, fits into this extension 7. Two cylindrical surfaces 10 and 11, arranged coaxially with respect to each other, depend from the upper portion of the plug. The diameter of each of these cylinders is so chosen as to exceed that of gas inlet opening 1. Their height is determined by a plane, a perpendicular to which preferably forms an angle different from zero with the axis of symmetry of each of the cylinders. In addition, cylinder 10 is provided at its lower edge with a generally rectangular notch 12. As is apparent from the drawing, both cylinders are of conical form and have their greatest wall thickness at the end at which they join upper plate 8. By virtue of the specific construction described above, there exist between gas inlet opening 1 and cylinder 11, on the one hand, and between cylinder 10 and side wall 6, on the other, annular passages whose respective heights are not the same at all points on their circumferences. In consequence, each passage has a region of maximum impedance to flow and one of minimum impedance, the passages being so arranged that the corresponding regions are located at opposite points on their respective circumferences. The bottom of the plug has two annularly shaped conical passages 5 which do not completely encircle the plug and from which depend two additional cylindrical surfaces 3 and 4 oriented toward the liquid surface. These form two passages 2 whose width is greatest nearest the liquid surface, thereby facilitating the run-off of the drops.

In another form of the invention the two cylinders 10 and 11 may be arranged eccentrically with respect to the lower portion of the plug so that the annular passages defined by gas inlet opening 1 and cylinder 11, on the one hand, and by cylinder 10 and side wall 6, on the other, have widths which vary along their circumferences. This is another way to provide passages having regions of minimum and maximum impedance to flow.

When gas which bears liquid droplets is evolved, it arrives via gas inlet opening 1 in the annular passage defined between that opening and cylinder 11. There the gas loses a substantial part of its kinetic energy. At the same time droplets of liquid are precipitated out, so that eventually a liquid film forms under the influence of the forces of adhesion and capillary action. Further precipitation of droplets causes the formation of drops in the lowest regions of the passage. These return to the liquid via passage 5, which also contains a film of liquid. The effect of the passage between cylinder 10 and side wall 6 is the same as that between gas inlet opening 1 and cylinder 11. The gas escapes via opening 9, while a liquid film is formed between cylinder 10 and side wall 6. Additional gas which may be evolved then traverses the innermost passage preferentially in its region of minimum height, rupturing the liquid film in the process. This region is diametrically opposed to the region of minimum flow impedance between cylinder 10 and side wall 6, the latter region being defined by the rectangular notch 12. Diametrically opposed to this notch is escape opening 9. By virtue of this construction the gas must follow a very long path, in the course of which the droplets are retained in the liquid films. Their unimpeded return is facilitated by the passages formed by cylinders 3 and 4. The latter also prevent large drops of liquid, which come from the main body of liquid when the battery is suddenly agitated, from reaching the interior of the plug through passages 5. Since such agitation is unavoidable for storage batteries in normal use, the formation of liquid films in these passages occurs even before there is any gas evolution. This is because larger drops are capable of reaching the interior of the plug through the gas inlet opening. It has been determined that, even for the greatest agitation which can occur in practice, the plug provides a liquid-tight closure, that is, no liquid escapes through opening 9.

It will be understood that plugs in accordance with this invention may be employed in any situation in which liquids are to be transported in containers without gas-tight closure.

I claim:

1. A container plug for returning liquid droplets from a gas stream into a container capable of containing liquid and gas and closed above the liquid level by said plug, comprising a separate first upper cylindrical plug portion having at least first and second downwardly dependent cylindrical extensions of varying heights, an outlet means and a second separate lower cylindrical plug portion connected to said first plug portion, said second plug portion having an upwardly extending cylindrical inlet means, downwardly extending drain outlet means and an upwardly extending side wall, said inlet means and a side wall defining a chamber therebetween, the first extension depending downwardly within said chamber from the upper portion and arranged around said inlet means to define an annular passage and the second extension extending into said chamber and being spaced from said wall and also arranged around said inlet means to form therebetween a second annular passage, at least one of said passages being of varying height in the interior of the plug, each passage having a dimension sufficient to hold a liquid film therein by the adhesion forces of capillary action, said plug providing in its interior a path of a size sufficient to provide in its interior a path of variable impedance to the flow of said gas leading through films of said liquid.

2. The plug of claim 1 characterized in that said lower portion is internally rotationally symmetrical, said inlet means is frusto-conical in shape, said lower portion has an inclined bottom region, said drain outlet means comprises two annularly shaped passages arranged in mirror-image relationship to each other and tapering toward the interior of the plug, and said side wall is provided with an external thread and terminates in a cylindrical extension.

3. The plug of claim 1 characterized in that at least the innermost of said downwardly dependent cylindrical extensions has an inclined lower edge.

4. The plug of claim 2 further characterized in that said tapered annularly shaped passages are conical.

5. The plug of claim 2 characterized in that the outer of said dependent extensions is provided with a notch in its lower edge.

6. The plug of claim 5 further characterized in that said notch is generally rectangular.

7. The plug of claim 1 characterized in that said downwardly dependent cylindrical extensions comprise two concentrically arranged hollow cylinders, the inner of said cylinders having an inclined lower edge and the outer of said cylinders being provided with a notch in its lower edge.

8. The plug of claim 1 characterized in that the height of the passage defined between the inlet means and the innermost of said dependent extensions is non-uniform.

9. The plug of claim 1 further characterized in that the heights of both said passages are non-uniform.

10. The plug of claim 1 further characterized in that said outlet means comprises two annularly shaped conical passages extending through the bottom wall of said second plug portion and not completely encircling the plug and two additional downwardly dependent cylindrical extensions.

11. The plug of claim 10 characterized in that said last-named cylindrical extensions define a conical passage between them.

12. The plug of claim 9 characterized in that the regions of said passages providing minimum impedance to the flow of gas are in diametrically opposed locations.

13. The plug of claim 12 further characterized in that the outlet means is placed near that side of the second annular passage which provides the maximum impedance to gas flow.

14. The plug of claim 1 characterized in that the widths of said first and second annular passages non-uniform.

References Cited

UNITED STATES PATENTS

| | | | |
|---|---|---|---|
| 1,010,695 | 12/1911 | Sloan | 136—177.1 |
| 1,459,121 | 6/1923 | Van de Wiel | 136—177.1 |
| 2,565,674 | 8/1951 | Sachlin | 136—177.21 |
| 2,835,720 | 5/1958 | Buskirk | 136—177 |
| 2,926,211 | 2/1960 | Sturges | 136—177 |
| 2,930,831 | 3/1960 | Hemig | 136—177 |
| 3,803,256 | 3/1963 | Slautterback | 136—177 |

ALLEN B. CURTIS, *Primary Examiner.*

WINSTON A. DOUGLAS, *Examiner.*

D. L. WALTON, *Assistant Examiner.*